United States Patent
Braun et al.

(10) Patent No.: US 12,261,913 B2
(45) Date of Patent: Mar. 25, 2025

(54) FAÇADE SERVER

(71) Applicant: ABB Schweiz AG, Baden (CH)

(72) Inventors: Roland Braun, Niederkassel (DE); Thomas Gamer, Brühl (DE); Ralf Jeske, Petershagen (DE); Anders Trosten, Västerås (SE); Jeff Harding, Fort Myers, FL (US); Mario Hoernicke, Landau (DE); Sten Gruener, Laudenbach (DE)

(73) Assignee: ABB Schweiz AG, Baden (CH)

( * ) Notice: Subject to any disclaimer, the term of this patent is extended or adjusted under 35 U.S.C. 154(b) by 192 days.

(21) Appl. No.: 17/940,481

(22) Filed: Sep. 8, 2022

(65) Prior Publication Data

US 2023/0075818 A1 Mar. 9, 2023

(30) Foreign Application Priority Data

Sep. 9, 2021 (EP) .................................. 21195756

(51) Int. Cl.
  *H04L 12/70* (2013.01)
  *G06F 12/10* (2016.01)
  *H04L 67/125* (2022.01)

(52) U.S. Cl.
  CPC ............ *H04L 67/125* (2013.01); *G06F 12/10* (2013.01)

(58) Field of Classification Search
  CPC ..... H04L 67/125; H04L 67/567; H04L 67/12; H04L 67/02; G06F 12/10
  USPC ....................................................... 709/203
  See application file for complete search history.

(56) References Cited

U.S. PATENT DOCUMENTS

| | | | | |
|---|---|---|---|---|
| 5,818,448 A | * | 10/1998 | Katiyar | H04L 67/01 709/219 |
| 2010/0306313 A1 | * | 12/2010 | Mahnke | G06F 9/466 709/203 |
| 2011/0035792 A1 | * | 2/2011 | Leitner | H04L 63/0815 726/8 |
| 2013/0191441 A1 | * | 7/2013 | Coakley | H04L 65/1069 709/203 |
| 2019/0107827 A1 | * | 4/2019 | Dhakshinamoorthy | G05B 19/4183 |
| 2019/0109872 A1 | * | 4/2019 | Dhakshinamoorthy | G06F 21/577 |
| 2020/0226084 A1 | * | 7/2020 | Das Sharma | G06F 13/362 |
| 2020/0409340 A1 | * | 12/2020 | Hampikian | G05B 19/00 |

(Continued)

FOREIGN PATENT DOCUMENTS

| | | | | |
|---|---|---|---|---|
| EP | 3723346 A1 | * | 10/2020 | H04L 67/12 |
| EP | 3890277 A1 | | 10/2021 | |

OTHER PUBLICATIONS

Elovaara, "Aggregating OPC UA Server for Remote Access to Agricultural Work Machines," Master's thesis, *Aalto University School of Engineering*, 75 pp. (Jun. 30, 2015).

(Continued)

*Primary Examiner* — Ario Etienne
*Assistant Examiner* — Elizabeth Kassa
(74) *Attorney, Agent, or Firm* — Leydig, Voit & Mayer, Ltd.

(57) ABSTRACT

The present disclosure is directed at a façade server. The façade server provides a configurable façade having a configurable address space and serving as an interface for a client and to provide a mapping between the configurable address space of the façade and a data space and/or an address space of an external server.

9 Claims, 5 Drawing Sheets

(56) References Cited

U.S. PATENT DOCUMENTS

2022/0179853 A1* 6/2022 Schiekofer ............ G06F 16/258

OTHER PUBLICATIONS

Seilonen et al., "Aggregating OPC UA servers for monitoring manufacturing systems and mobile work machines," *2016 IEEE 21st International Conference on Emerging Technologies and Factory Automation* (*ETFA*), 4 pp. (Sep. 6-9, 2016).
Tuomi, "Aggregating OPC UA Server for Flexible Manufacturing Systems," Master's thesis, *Aalto University School of Engineering*, 61 pp. (Jul. 7, 2015).
European Patent Office, Extended European Search Report in European Patent Application No. 21195756.8, 9 pp. (Feb. 21, 2022).
European Patent Office, Office Action in European Patent Application No. 21195756.8, 8 pp. (May 2, 2024).

* cited by examiner

FAÇADE SERVER

CROSS-REFERENCE TO RELATED APPLICATIONS

This patent application claims priority to European Patent Application No. 21195756.8, filed on Sep. 9, 2021, which is incorporated herein in its entirety by reference.

FIELD OF THE DISCLOSURE

The present disclosure relates to a server providing an interface between a client and one or more external servers, a computer-implemented method, a computer program product and a computer-readable medium.

BACKGROUND OF THE INVENTION

When providing systems including one or more external servers for use with a client, the problem may often occur that the one or more external servers each have their own address space and interface. While it is generally possible for a client to interact with different interfaces and address spaces, this is very inefficient, particularly when several different external servers are included in the system.

Aggregating servers are known that aggregate and consolidate the address spaces of several external servers, such that the client may only have to cope with one address space even if a plurality of servers is involved.

However, it still involves significant effort on the client side to adjust for the address space of the respective aggregating server.

It is therefore an objective of the present disclosure to provide a server that alleviates the burden on the client-side to accommodate for the address space of one or more external servers or an aggregating server.

BRIEF SUMMARY OF THE INVENTION

The present disclosure provides a façade server configured to provide a configurable façade having a configurable address space and serving as an interface for a client, and provide a mapping between the configurable address space of the façade and a data space and/or an address space of an external server.

The façade server serves to solve problems associated with different address spaces. An address space is a collection of nodes, which are connected by references. Using the references allows for browsing the address space step-by-step. A node is a data object that is addressable in the data space. It may be a type definition or an instance. As an example, a type may be a data type, a variable type, an object type, and a reference type. Instances may include objects, variables and methods.

BRIEF DESCRIPTION OF THE SEVERAL VIEWS OF THE DRAWING(S)

FIG. 1b is a diagram of a façade server having a different configuration than in FIG. 1a.

DETAILED DESCRIPTION OF THE INVENTION

Figure 1A:
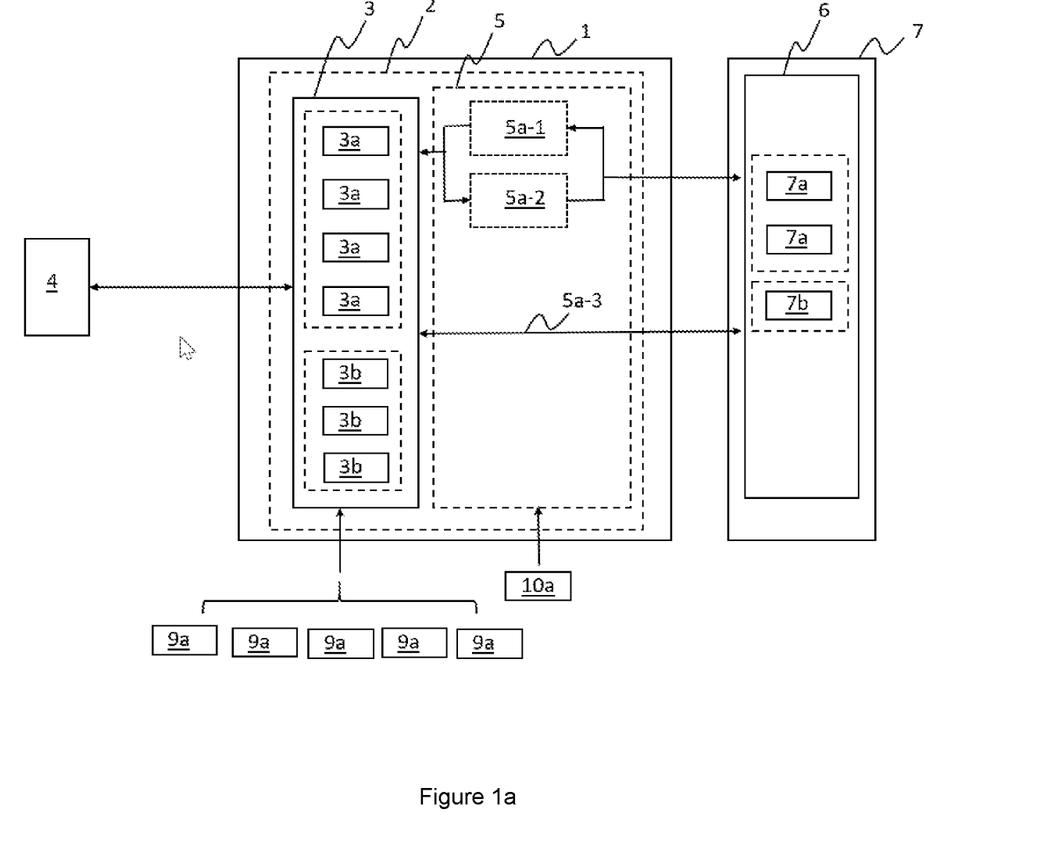
FIG. 1a is a diagram of an exemplary a façade server and exemplary interactions with a client and an external server, in accordance with the disclosure.

FIG. 1a illustrates an embodiment of a façade server 1 running a configurable façade 2, which has a configurable address space 3 comprising, in the configuration shown in FIG. 1a, nodes 3a and nodes 3b wherein reference signs 3a indicate instances and reference sign 3b type definitions.

The façade serves is an interface for a client 4. The client is not part of the façade server, but shown in FIG. 1 for better understanding the function of the façade server.

Furthermore, logic for transformations within the façade server, which will be addressed in more detail below, is indicated by the reference signs 5, 5a-1, 5a-2, and 5a-3.

Reference sign 6 indicates the address space of an external server 7, which is not part of the façade server and is shown for illustrative purposes in FIG. 1a. The arrows in FIG. 1a illustrate the direction of data being exchanged. Data exchange between the client and the façade server is bi-directional can include reading and writing. Data exchange between the external server(s) is also bi-directional and can include reading and writing.

Furthermore, a plurality of nodeset files 9a is shown in FIG. 1, the arrow indicating that the address space is built using the nodeset files.

Reference sign 10a indicates the configuration file for configuring the transformation 5. Indicated by the reference signs 5a-1 and 5a-2 are logic blocks, one for reading and one for writing data. The blocks may be provided by scripted logic, for example. Indicated by the reference sign 5a-3 indicates a read/write that does not involve logic blocks.

Figure 1B:
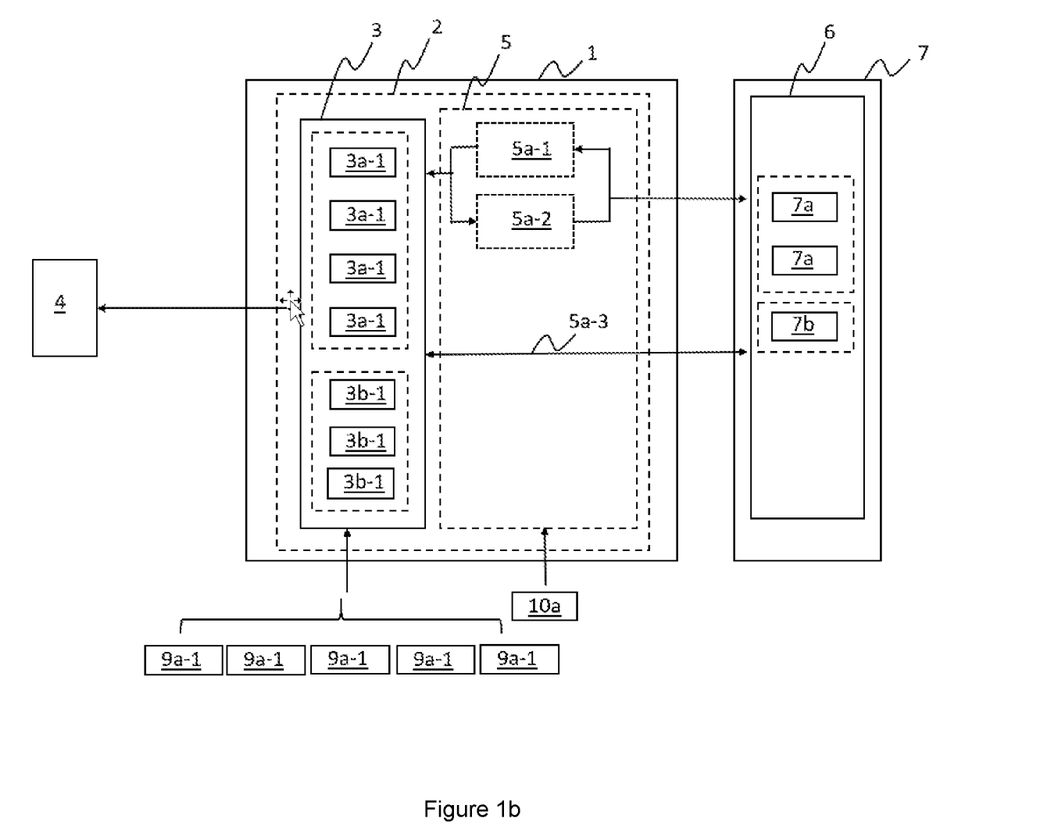

FIG. 1b essentially corresponds to FIG. 1a, the only difference being that the address space 3 is built from a different set of nodeset files 9a-1 and, accordingly, the façade comprises a different set of nodes 3a-1 and 3b-1.

In other words, FIGS. 1a and 1b illustrate the same façade server with two different configurations of the façade, more specifically, two different configurations of the address space of the façade.

Although the logic for transformations shown in FIG. 1b is the same as that in FIG. 1a, a different logic for transformation may be used to accommodate for the façade having a different configuration.

It is noted, that the client illustrated in FIG. 1b is the same as that in FIG. 1a for simplicity's sake. However, it may also be the case that different clients may apply different configurations of the façade to meet client-specific technical requirements.

Figure 2:
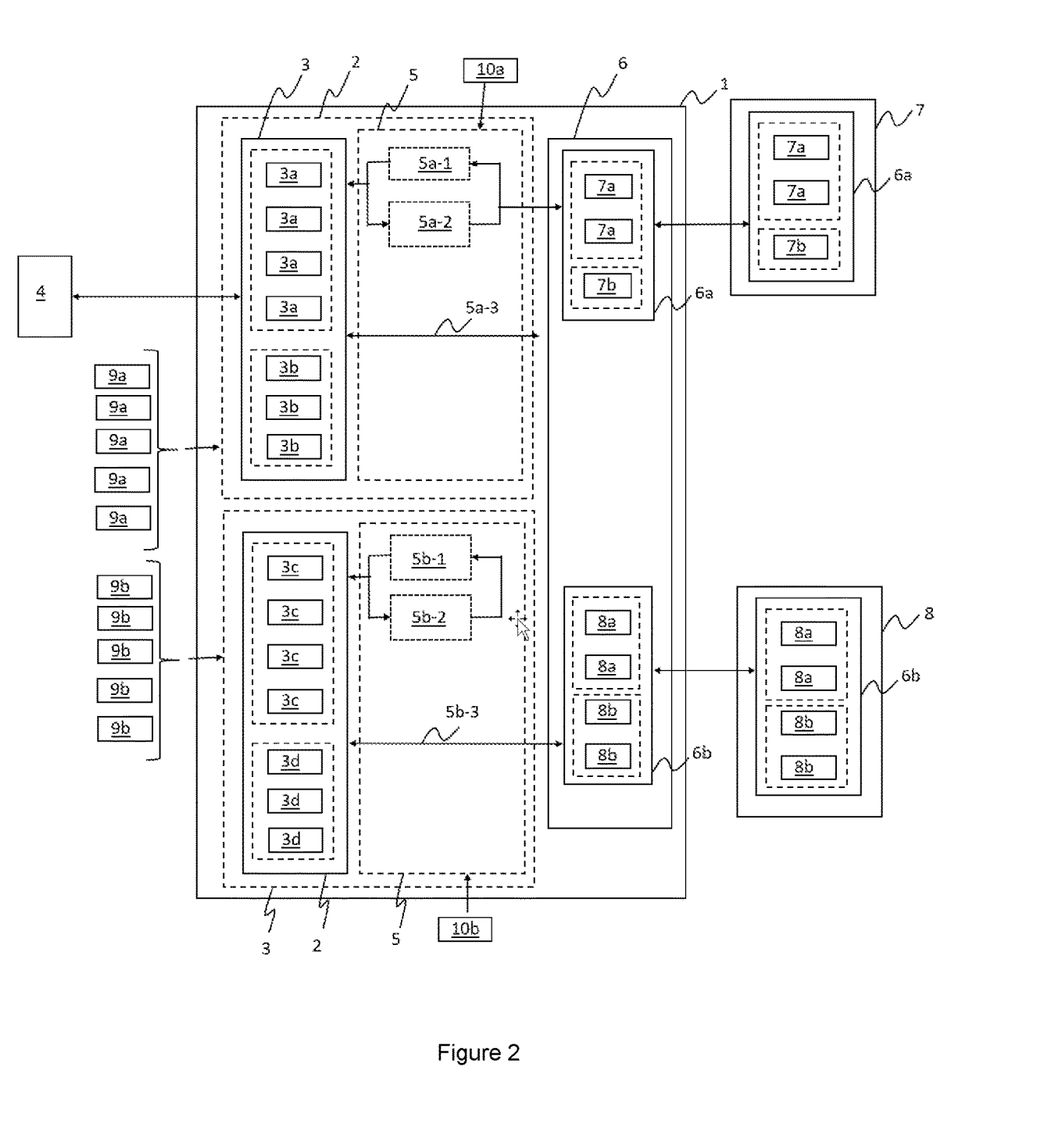
FIG. 2 is a diagram of an exemplary façade server and exemplary interactions with a client and an external server when the façade server is an aggregating server, in accordance with the disclosure.

FIG. 2 illustrates an embodiment of a façade server 1 that is configured as an aggregating server. In this case, the address space 6 is a consolidated address space on the aggregating server that consolidates the address space 6a of a first external server 7 and the address space 6b of a second external server 8.

The address space 6a of the external server 7 comprises nodes 7a and 7b, representing instances and type definitions, respectively. The address space of the external server 8 comprises nodes 8a and b, representing instances and type definitions, respectively.

The façade server is shown as running two façades that together provide an interface for the client 4.

The first façade is essentially configured as shown and explained in the context of FIGS. 1a and 1b with an address space 3 having nodes 3a and nodes 3b. The address space of the first façade is based on nodeset files 9a. and the logic 5 of the first façade is based on the configuration file 10a. The first façade essentially provides the functionality for the client to interact with the address space of server 7.

The second façade is similar to the first façade. Its address space 3 comprises nodes 3c, which represent instances, and nodes 3d which represent type definitions. The address space of the second façade is based on the nodeset files 9b and the logic 5 of the second façade is based on the configuration file 10b. The second façade essentially provides the functionality for the client to interact with the address space of server 8.

It is to be understood that, similarly to FIGS. 1a and 1b, each of the façades shown in FIG. 2 may be configured differently, depending on the nodeset files used to build them.

Figure 3:
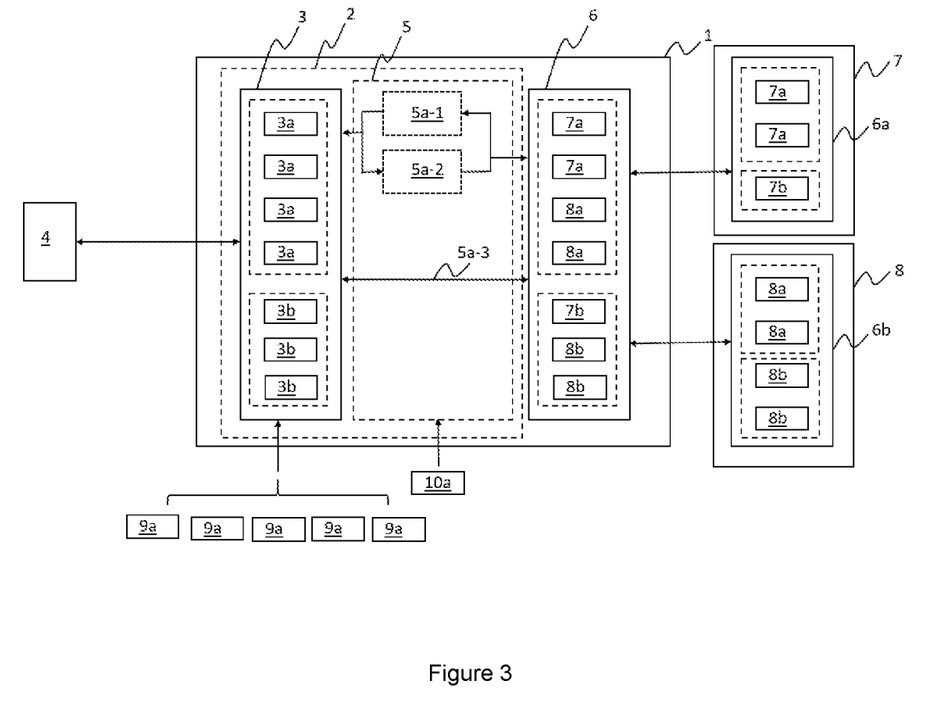
FIG. 3 is a diagram of another example for a façade server and exemplary interactions with a client and an external server when the façade server is an aggregating server, in accordance with the disclosure.

Moreover, depending on the configuration of the consolidated address space 6, it may not be necessary to provide two façades as an interface, but rather only one common façade may be used. This is illustrated in FIG. 3.

It is possible to selectively aggregate only part of the address space of an external server and map the partially aggregated address space to the façade, given functional compatibility between the partially aggregated address space and the façade.

It is noted that different numbers and types of external servers may be used. Similarly, the façade server may be used with different clients. Furthermore, there may be different numbers of façades than shown in the figures and each of the façades may have a different configuration than illustrated in the figures, e.g., different kinds and numbers of nodes. The transformation logic 5 is optional, depending on the address spaces that are involved, and may also be configured differently than shown in the figures.

All of the above embodiments may, for example, be implemented in an OPC architecture, where the client is an OPC UA client and, towards the OPC UA client, the façade server has the function of an OPC UA server and, towards the external servers, the façade server has the function of an OPC UA client. If the system comprises an OPC DA, HDA, AE server as an the external server, the façade server may have a function of an OPC DA client towards said external server, while the façade server, nonetheless, has a function of an OPC UA server towards the OPC UA client, i.e., the façade is nonetheless modelled by means of an OPC UA server.

An example of the computer-implemented method, which is performed at a façade server will be described below. A façade server as described above in the context of FIGS. 1 to 3 may be used. Alternatively, any suitable façade server may be used.

The method comprises, at the façade server, providing a configurable façade, which has a configurable address space and serves as an interface for a client. The address space may comprise a plurality of nodes, for example as shown in FIGS. 1 to 3. In order to configure the façade, one or more configuration files, for example nodeset files 9a or 9b, may be accessed and the address space of the façade may be built based thereon.

The method may further comprise providing a mapping between the configurable address space of the façade and a data space and/or an address space of an external server. For example, the logic 5 described above may be used to provide this mapping.

The method may also comprise re-configuring the façade by accessing one or more configuration files, e.g., nodeset files 9a-1 mentioned above, and building the façade based thereon.

The method may also comprise configuring and optionally re-configuring the above-mentioned logic 5, for example by means of the above-mentioned configuration file 10b.

In case the method is performed at a façade server that is an aggregating server, it may aggregate the data space and/or address space of each of a plurality of external servers. The method may further comprise providing, as an interface for the client server, a plurality of façades, each having a configurable address space, in the manner described above, for example as illustrated in FIG. 2.

For each of the plurality of external servers, a mapping between the configurable address space of one of the façades and the aggregated data space and/or address space of the external server may be provided. This allows for efficient communication between client and external servers.

It can be understood from the above, that the disclosed façade server allows for wrapping the control centric models of a DCS (distributed control system) with a configurable address space that follows any customer-selected model standard, for example, any OPC UA specified model standard.

Moreover, it can be understood from the above that, in case of an aggregating server, façade provides a flexible embedded model translation layer. Embedded scripted logic can overcome incompatibilities between aggregated nodes and façade nodes.

A more detailed example of a façade server and method, where the façade server is an aggregating server, is provided below. During its start phase the aggregating server, e.g., a OPC UA Server creates a consolidated image of any of the address spaces of external servers, e.g., other aggregated OPC UA Servers. The result is an aggregated address space that represents all nodes from other servers on remote.

At the end of the start phase the aggregating server uses 1 . . . n nodeset files describing the façade-model that shall be seen in front of the aggregated address spaces. Sometimes it may need more than one nodeset file, since the façade model may be related to an existing OPC UA Companion Specification, which means, the Aggregation OPC UA Server must import any of the nodeset files defined by the applied OPC UA Companion Specifications.

The import of these nodeset files typically results in meta-data found in the type definitions in the address space. Another nodeset file will describe any of instances, nodes that represents the interactive part of the façade model. Included in this nodeset file are references describing the data propagation. These reference link nodes of the aggregated address space(s) to nodes of the façade model.

A reference type that describes corresponding nodes is used so the aggregating UA Server can transfer data in both directions between corresponding nodes, depending on the actual OPC UA Service that accesses the façade-node.

If needed the Aggregating UA Server loads configuration data to add scripted logic. Both come into play, if the data ends that shall be connected are technically incompatible, so data cannot be copied simply from on to the other end. In this case scripted logic can provide the logical bridge between the node in the aggregated address space and a node in the façade model.

The proposed server may provide a reference type describing propagation (direction) that is bound to the OPC UA Service accessing a façade-node.

On reading a façade-node, the read request is forwarded to the corresponding nodes in a chain until an aggregated node has been found that must be read from the aggregated OPC UA Server on remote.

The result of this read access then automatically propagates to the face-node.

On write the value of modified façade node is forwarded to any of the corresponding nodes. When hitting an aggregated node, the modified value is written the aggregated OPC UA Server on remote.

With this general service-bound data propagation path, the Aggregating OPC UA Server allows to insert scripted logic into the path of data propagation. This way the Aggregating OPC UA Server supports conversion logic in both directions, which is advantageous because the logic to translate a value "a" to "b" is not always the same in the opposite direction.

Figure 4:
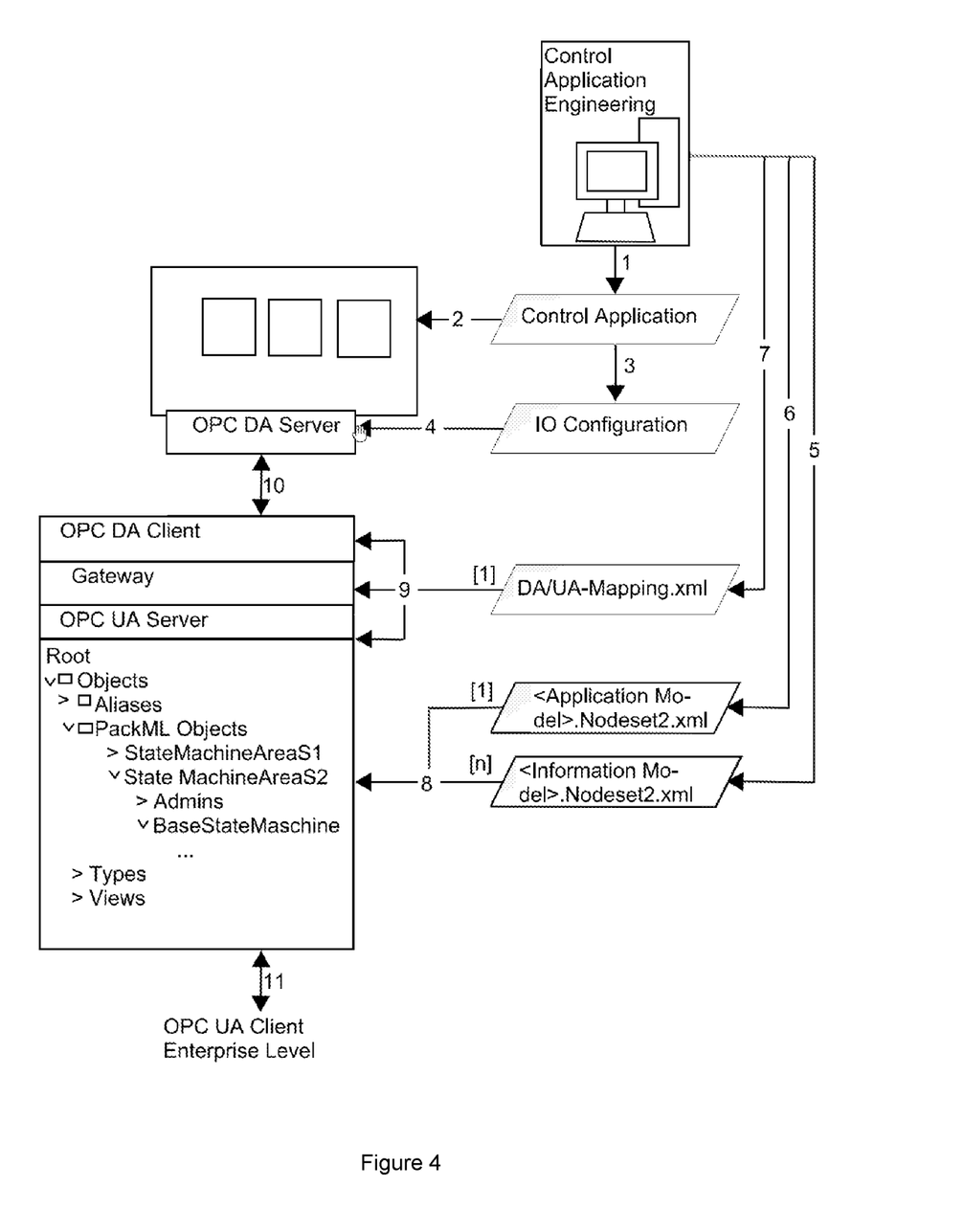
FIG. 4 a flowchart of steps that may be involved in configuring a façade server, in accordance with the disclosure.

Another detailed example is provided below to illustrate the sequence of steps that may be involved in setting up and configuring a façade server, making reference to FIG. 4. The numbers used for the subsequent numbered sections correspond to the numbers used on the connecting lines in FIG. 4. Here, as an example, the external server is an OPC DA Server, the façade server is an OPC UA Server, and the client is an OPA UA client.

(1) Existing engineering tool(s) may be used to create a control application. The development process (engineering) leverages existing programming libraries that were tailored to the application domains like minerals, oil, and gas industry. Any type of library may be used. Nevertheless, the libraries are mentioned to emphasize, the (approved) libraries are not affected by the method of this example.

(2) The control application can be downloaded to the controller.

(3) The designed control application also results in an IO— Configuration for the OPC DA Server enabling data access through named "OPC DA Items" ("OPC DA item" is the term for the variable an OPC DA Client can read or write.)

(4) The IO—Configuration is loaded into the OPC DA Server.

(5) The engineering tool selects OPC UA compliant/specified information model(s) by selecting the related nodeset files, i.e., XML files applying an OPC UA specified XSD Schema.

(6) The engineering tool creates a representation of the control system inside a nodeset file, describing a part of the address space that matches the previously selected information model. (see (5)) The engineering tool applies the model definition rules from the previously selected information models.

(7) The engineering tool describes the mapping between the address space of the OPC DA Server and the address space of the OPC UA Server. The description allows to translate between OPC UA Services accessing elements the address space of the OPC UA Server and the OPC DA Items of the OPC DA Server.

(8) The OPC UA Server loads selected nodeset files describing the standardized models (<Information Model>.Nodeset2.xml) to prepare an address space based on imported nodeset files. Similarly, the nodeset file <Application Model>.Nodeset2.xml is loaded to represent the control system specific part of the address space.

(9) The translation layer part is configured from the imported DA/UA Mapping.xml. The DA Client uses the information about OPC DA Items that shall be addressed in the OPC DA Server. The OPC UA Server uses the information about the address space's nodes that shall be linked to OPC DA Items. The Gateway takes the information about how to translate between the OPC UA Server and the OPC DA Client.

(10) With the commissioned configurations the DA Client is enabled to run communication with the OPC DA Server. The communication is triggered by the OPC DA Client (see (11)).

(11) With the commissioned configurations the OPC UA Server enables information exchange with the OPC UA Client representing the enterprise level. Feeding this OPC DA Client with information from the OPC DA Server, conveyed and translated though the Gateway in the back-end of the OPC UA Server.

As will be understood from the present disclosure, the façade server and method as described herein may have one or more of the following advantages. It may make it is possible to flexibly select an information model for the OPC UA front end of the DCS, to create the information model compliant representation of the control system, to infer the mapping between the address space of the OPC UA Server and the functions of the control system, bi-directionally translate between the OPC DA (AE, HDA) Server and the OPC UA Server, to optionally add business logic to the translation functions if the OPC UA specified information model defines behaviors that are not present in the control system, to optionally add data type related conversion logic when there is need to translate between data items on either ends where semantics are the same but applied data types are different.

In general, one or more information models may be used for building at least part of the address space, i.e., one or more data models may prescribe how the address space is built.

An address space may be able to support several information models. To do so, the address space may be organized by means of namespaces. The identity of a name space is linked with a URL.

The façade may be seen as a transformed representation of an address space that differs from the address space used or expected by the client. In particular, it may be a transformed representation of the consolidated address space of an aggregating server.

As briefly mentioned above, aggregating servers provide an aggregation, i.e. a consolidated representation, of the address spaces of several external servers in a common consolidated address space. The aggregating server may, for example, forward service requests from the client to the external servers.

The façade server may be configured to run the façade nodes. In addition, it may optionally also be configured to implement the logic for transforming the address space, including logic necessary for providing a translation for a client access of façade nodes to nodes of the address space of the external server or the consolidated address space.

As can be seen from claim 1, the façade is configurable. This means that the façade server does not prescribe the configuration of the interface that is visible to the client. Instead, it is possible for the client to configure the façade, and, accordingly, the interface.

Thus, the façade server of the present disclosure allows for seamless integration of the façade server and any external servers supported by the façade server into a client system.

One way of providing a configuration of the façade is to allow for a client to configure the data model or data models used to build the façade, in particular the nodes of the façade.

It is noted that in the following, some of the features will be described with reference to the examples of OPC UA and/or OPC DA servers and/or clients. The reason is that the façade server is particularly suitable in this context. However, the invention is not limited to the use in or context of OPC UA/DA.

OPC DA, HDA, and AE is a standard defined by the OPC foundation for communicating data (DA), trends (historical DA, HDA), and alarms and events (AE), and is also referred to OPC Classic. A DA item is an addressable variable object in the data space of a OPC DA server, which resembles a flat list of variables. OPC Classic is a predecessor of OPC UA (unified architecture), which is an object-oriented middleware of automation-technology systems built on IP (internet protocol).

In the context of OPC UA, for example, the façade server, towards the client, has the role of a OPC UA server. Towards the external servers, the façade server has the role of a OPC UA client and the external server has the role of the OPC UA server.

According to the present disclosure, the façade server may be configured to provide, as an interface for the client, a plurality of façades, each having a configurable address space. The façade server may be an aggregating server configured to aggregate the data space and/or address space of each of a plurality of external servers and may be configured to provide, for each of the plurality of external servers, a mapping between the configurable address space of one of the façades and the aggregated data space and/or address space of the external server.

This is particularly advantageous because it allows for adding and removing external servers and accommodating for the addition or removal in an easy manner while still maintaining, toward the client, the expected interface.

The façade or each of the façades may be configurable by means of one or more nodeset files.

The advantage of nodeset files is that they allow for a straightforward configuration of the façade simply by selecting nodeset files that correspond to the configuration. The nodeset files comprise the information required to configure the address space of the façade, such that no specific knowledge is required on the client side to perform a suitable configuration. For example, a nodeset file is suitable for providing all sorts of information, including the data propagation for each node. Moreover, using nodeset files allows for the façade server to be highly compatible with client systems. Furthermore, adding and removing an external server to/from the system can be easily achieved by adding additional façade nodes using nodeset files.

Nodeset files describe the address space. For example, in case the address space of the façade implements a plurality of information models, a plurality of nodeset files may be used. Nodeset is a standardized data format, which is xml-based.

Nodeset files are, for example, commonly used in the context of OPC UA. Accordingly, in an embodiment, the façade server may be a OPC UA server and the client may be a OPC UA client and Nodeset files may be used for configuring the façade.

Nodeset files are specified, for example, in the OPC UA standard OPC 10000-6.

Configuring the façade or each of the façades by means of one or more nodeset files may comprise implementing one or more data models to obtain the address space of the façade, the address space being defined by the one or more nodeset files.

The advantage of this is that significant flexibility in terms of data models is provide due to the use of a configurable façade, particularly, when the configuration is performed using nodeset files.

The façade may be configured to provide a transformed representation of the data space and/or address space of the external server and a logic for a transformation that provides the transformed representation may be configurable. Configuring the logic for the transformation may comprise configuring a bidirectional link of data of the façade and data of the external server, for example to provide data forwarding functionality. Alternatively or in addition, configuring the logic for the transformation comprises configuring a unidirectional link to provide forwarding functionality, particularly forwarding of alarms and/or events sent by the external server.

Thus, whenever two address spaces are not, as such, compatible for immediate communication, efficient propagation of data can still be ensured.

In particular, the logic for transformation may comprise scripted logic that allows for data conversion, for example when a method call needs translating into data to be read and/or written, and/or that allows for accommodating business logic dictated by an information model underlying the façade when the external server does not provide said business logic.

This allows for overcoming potential incompatibilities and accommodating for missing functionalities, thereby ensuring compatibility and supporting a wide range of functionality.

The façade server may be an OPC UA server, the client may be a OPC UA client, and the external server may be an OPC UA server or an OPC DA server.

As mentioned above, the configurable façade may be particularly advantageous when employed in OPC systems, as they are often used in contexts where a façade functionality is particularly useful, i.e., allowing for efficient data exchange between multiple external servers associated with devices of a plant and the client. In particular, the façade server may be an aggregating server as described above, which allows for improved data exchange in a system having multiple external servers.

It is noted that the façade servers outlined above may comprise one or more processing units and/or one or more storage units.

The invention may also provide a system comprising one of the above façade servers, in particular aggregating servers, and one or more, in particular aggregated, external servers. Alternatively, or in addition, the system may comprise a client, for example a OPC UA client, that communicates with the façade server, in particular, that is configured to perform read and/or write operations on the aggregating server via the façade.

The present disclosure also provides a computer-implemented method, the method comprising, at a façade server, particularly any of the façade servers described above, providing a configurable façade, which has a configurable address space and serves as an interface for a client, and providing a mapping between the configurable address space of the façade and a data space and/or an address space of an external server.

It is noted that the façade server may comprise one or more processing units configured to carry out the method steps. The façade server may comprise or have access to one or more memory units where information for the configuration of the façade, e.g. configuration files, which may include nodeset files, are stored.

The façade server may be an aggregating server configured to aggregate the data space and/or address space of each of a plurality of external servers and the method may further comprise providing, as an interface for the client server, a plurality of façades, each having a configurable address space, and providing, for each of the plurality of external servers, a mapping between the configurable address space of one of the façades and the aggregated data space and/or address space of the external server.

The method may further comprise configuring the façade or each of the façades by means of one or more nodeset files.

Configuring the façade or each of the façades by means of one or more nodeset files may comprise implementing one or more data models to obtain the address space of the façade, the address space being defined by the one or more nodeset files.

The façade may provide a transformed representation of the data space and/or address space of the external server and the method may comprise configuring a logic for a transformation that provides the transformed representation. Configuring the logic for the transformation may comprise configuring a bidirectional link of data of the façade and data of the external server, for example to provide data forwarding functionality. Alternatively, or in addition, configuring the logic for the transformation may comprise configuring a unidirectional link to provide forwarding functionality, particularly forwarding of alarms and/or events sent by the external server.

The logic for transformation may comprise scripted logic that allows for data conversion, for example when a method call needs translating into data to be read and/or written, and/or that allows for accommodating business logic dictated by an information model underlying the façade when the external server does not provide said business logic.

The façade server may be an OPC UA Server, the client may be a OPC UA Client, and the external server may be an OPC UA server or an OPC DA server.

The present disclosure also provides a computer program product comprising instructions which, when the program is executed by a computer, cause the computer to carry out any of the above methods.

The present disclosure also provides a computer-readable medium comprising instructions which, when executed by a computer, cause the computer to carry out any of the above methods.

The features and advantages outlined above in the context of the system similarly apply to the methods, the computer program product, and computer-readable medium described herein.

Further features, examples, and advantages will become apparent from the detailed description making reference to the accompanying drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A façade server comprised to provide:
   a configurable façade having a configurable address space and serving as an interface for a client, and
   a mapping between the configurable address space of the façade and a data space and/or an address space of an external server, wherein the configurable address space is built using one or more data models included in one or more nodeset files, wherein the configurable address space comprises a first set of nodes indicating instances, wherein a second set of nodes indicates type definitions, wherein the one or more data models have been configured by the client, wherein the façade or each of the façades is configurable utilizing the one or more nodeset files, and wherein configuring the façade or each of the façades by means of the one or more nodeset files comprises implementing the one or more data models to obtain the address space of the façade, wherein the address space is defined by the one or more nodeset files.

2. The façade server according to claim 1, further comprised to:

provide, as an interface for the client, a plurality of façades, each façade of the plurality of façades having a configurable address space, wherein the façade server is an aggregating server for aggregating the data space and/or address space of each of a plurality of external servers, and wherein the façade server provides, for each of the plurality of external servers, the mapping between the configurable address space of one of the façades and the aggregated data space and/or address space of the external server.

3. The façade server according to claim 1, wherein the façade provides a transformed representation of the data space and/or address space of the external server, wherein a logic for a transformation that provides the transformed representation is configurable, wherein configuring the logic for the transformation comprises configuring a bidirectional link of data of the façade and data of the external server to provide data forwarding functionality, and/or wherein configuring the logic for the transformation comprises configuring a unidirectional link to provide forwarding functionality for forwarding of alarms and/or events sent by the external server.

4. The façade server according to claim 3, wherein the logic for transformation comprises scripted logic that allows for data conversion when a method call needs translating into data to be read and/or written, and/or that allows for accommodating business logic dictated by an information model underlying the façade when the external server does not provide said business logic.

5. The façade server according to claim 1, wherein the façade server is an OPC UA Server, the client server is an OPC UA Client, and the external server is an OPC UA server or an OPC DA server.

6. A computer-implemented method, the method comprising, at a façade server:

providing a configurable façade, which has a configurable address space and which serves as an interface for a client;

providing a mapping between the configurable address space of the façade and a data space and/or an address space of an external server, wherein the configurable address space is built using one or more data models included in one or more nodeset files, the configurable address space comprising a first set of nodes indicating instances and a second set of nodes indicating type definitions, the one or more data models having been configured by the client; and configuring the façade or each of the façades by means of the one or more nodeset files, wherein configuring the façade or each of the façades by means of the one or more nodeset files comprises implementing the one or more data models to obtain the address space of the façade, wherein the address space is defined by the one or more nodeset files.

7. The method according to claim 6, wherein the façade server is an aggregating server for aggregating the data space and/or address space of each of a plurality of external servers, and wherein the method further comprises;

providing, as an interface for the client server, a plurality of façades, each having a configurable address space, and providing, for each of the plurality of external servers, the mapping between the configurable address space of one of the façades and the aggregated data space and/or address space of the external server.

8. The method according to claim 6, wherein the façade provides a transformed representation of the data space and/or address space of the external server, and wherein the method further comprises:

configuring a logic for a transformation that provides the transformed representation, wherein configuring the logic for the transformation comprises configuring a bidirectional link of data of the façade and data of the external server, to provide data forwarding functionality, and/or wherein configuring the logic for the transformation comprises configuring a unidirectional link to provide forwarding functionality for forwarding of alarms and/or events sent by the external server.

9. The method according to claim 8, wherein the logic for transformation comprises scripted logic that allows for data conversion when a method call needs translating into data to be read and/or written, and/or that allows for accommodating business logic dictated by an information model underlying the façade when the external server does not provide said business logic.

* * * * *